US011046137B2

(12) United States Patent
Mukainakano

(10) Patent No.: US 11,046,137 B2
(45) Date of Patent: Jun. 29, 2021

(54) FIBER-REINFORCED RESIN STRUCTURE BODY

(71) Applicant: SUBARU CORPORATION, Tokyo (JP)

(72) Inventor: Yuya Mukainakano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/420,748

(22) Filed: May 23, 2019

(65) Prior Publication Data

US 2020/0094640 A1 Mar. 26, 2020

(30) Foreign Application Priority Data

Sep. 20, 2018 (JP) .............................. JP2018-176223

(51) Int. Cl.
*B60G 7/00* (2006.01)
*B29C 70/54* (2006.01)
*B29L 31/30* (2006.01)
*B29C 70/34* (2006.01)

(52) U.S. Cl.
CPC ............ *B60G 7/001* (2013.01); *B29C 70/342* (2013.01); *B29C 70/54* (2013.01); *B29L 2031/3005* (2013.01); *B60G 2206/012* (2013.01); *B60G 2206/122* (2013.01); *B60G 2206/7101* (2013.01)

(58) Field of Classification Search
CPC ............ B60G 7/001; B60G 2206/7101; B60G 2206/012; B60G 2206/122; B29C 70/342; B29C 70/54; B29L 2031/3005
See application file for complete search history.

(56) References Cited

U.S. PATENT DOCUMENTS

| 6,264,868 B1* | 7/2001 | Marchant ................ B29C 33/52 264/221 |
| 2008/0007022 A1* | 1/2008 | Jones ........................ B60G 3/16 280/124.13 |
| 2012/0315414 A1* | 12/2012 | Wesch ................. B62D 29/005 428/34.1 |
| 2019/0315088 A1* | 10/2019 | Bomphray .............. B32B 27/36 |

FOREIGN PATENT DOCUMENTS

| JP | 2000-108232 A | 4/2000 |
| WO | WO-2018007815 A1 * | 1/2018 ............. B32B 27/38 |

\* cited by examiner

*Primary Examiner* — Brian Handville
(74) *Attorney, Agent, or Firm* — McGinn I.P. Law Group, PLLC.

(57) ABSTRACT

A fiber-reinforced resin structure body includes a first member and a second member. The first member is made of a fiber-reinforced resin; and the second member is made of a fiber-reinforced resin and forming a closed space by being joined to the first member. One or both of the first member and the second member includes a side wall having two side surfaces located on both sides in a direction of a load loaded on a swing end of the fiber-reinforced resin structure body. A joint joining the first member and the second member together is provided more on an inside than an outer wall surface located on an opposite side to the closed space out of the two side surfaces is.

20 Claims, 12 Drawing Sheets

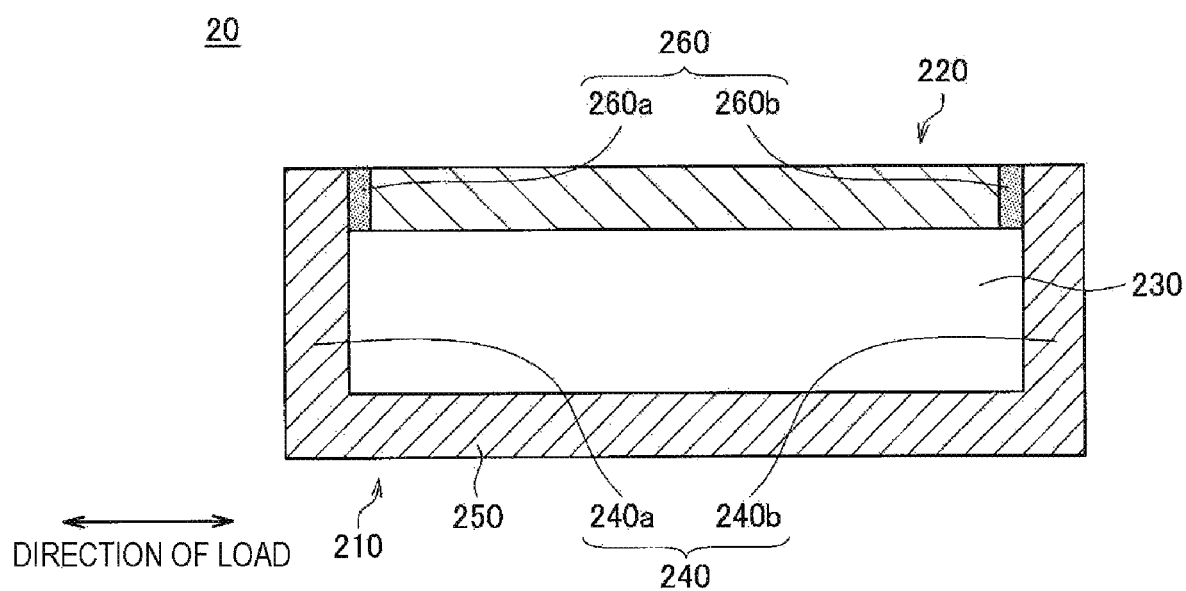

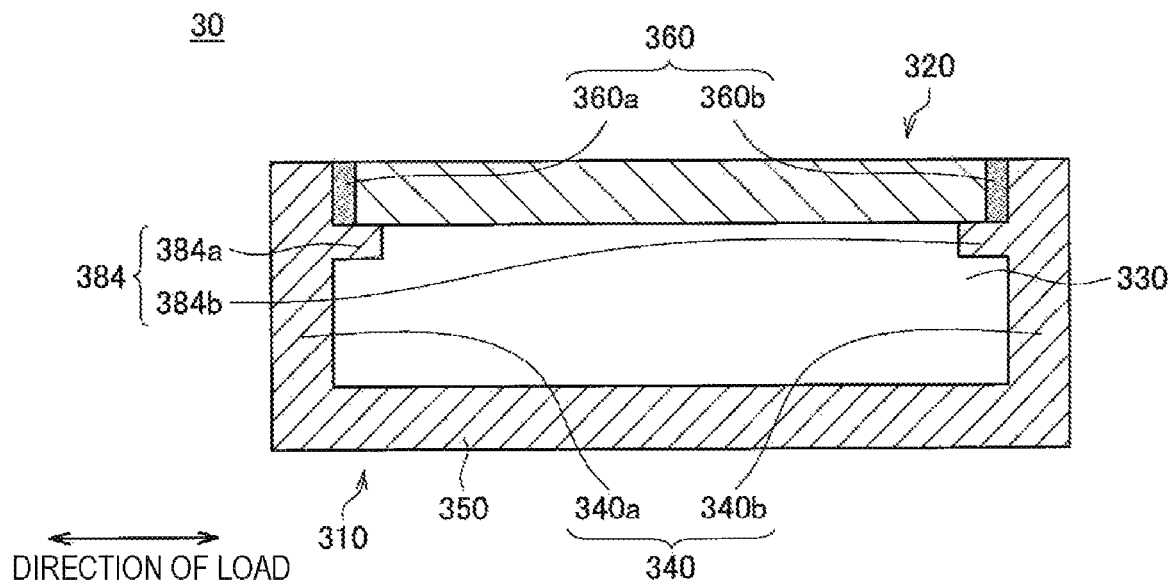
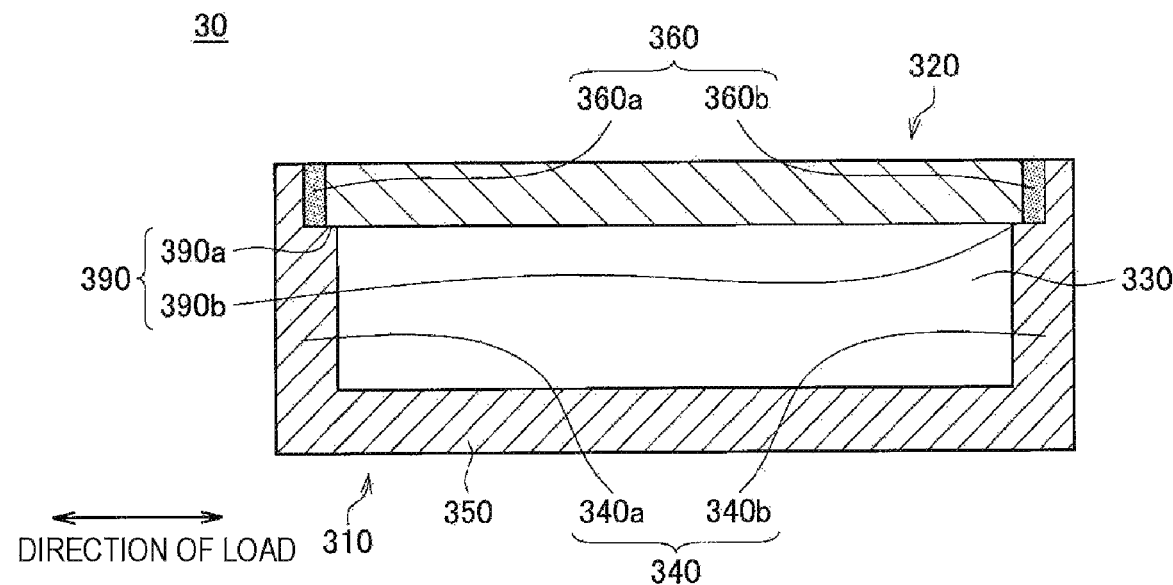

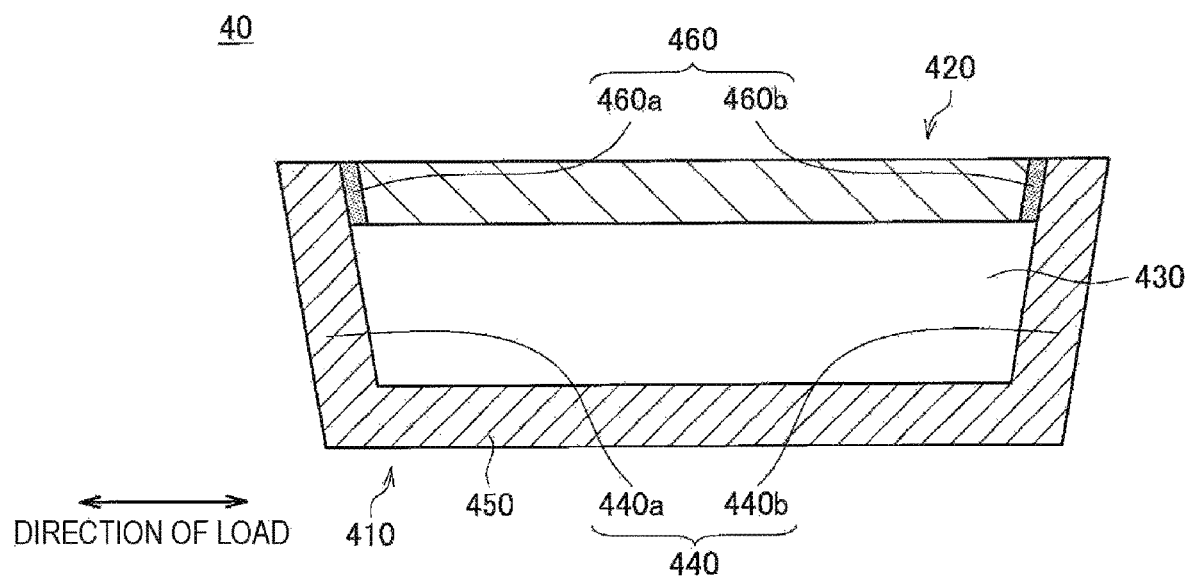
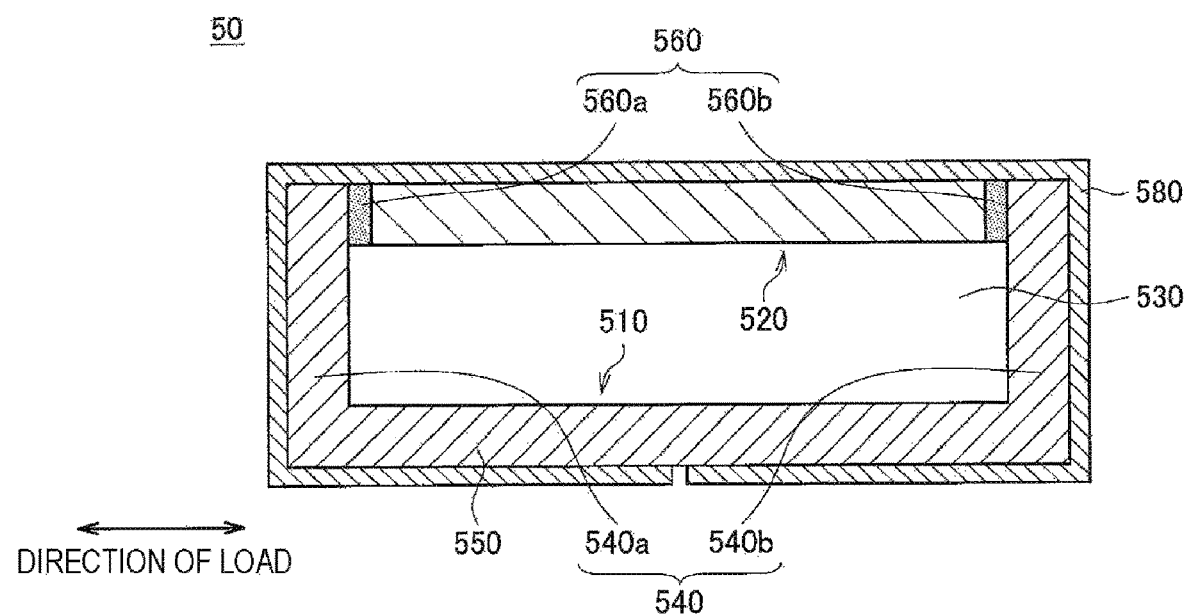

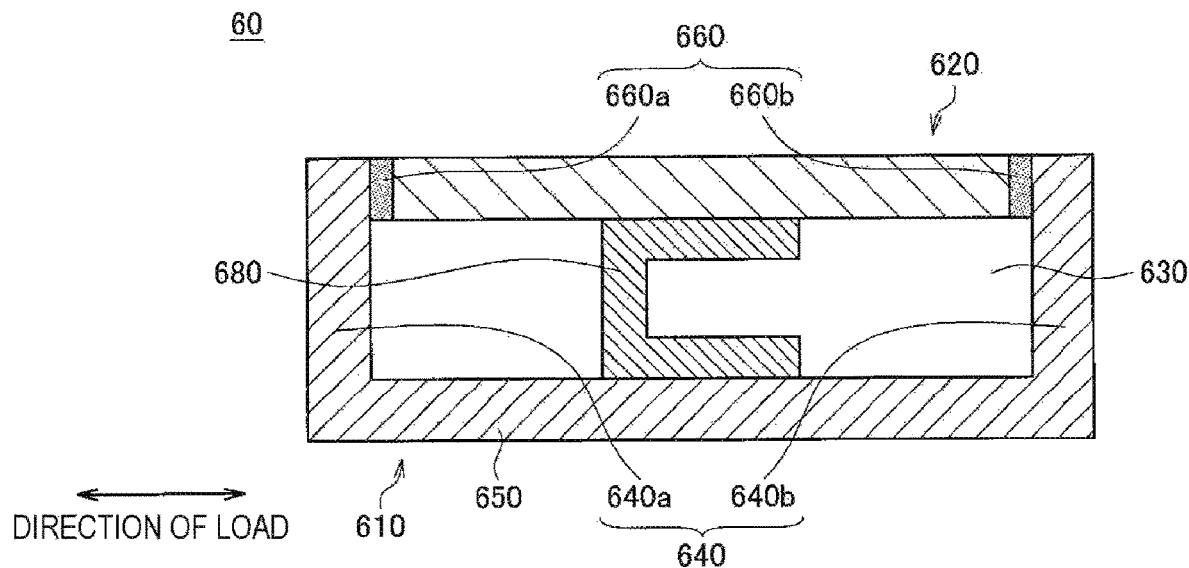
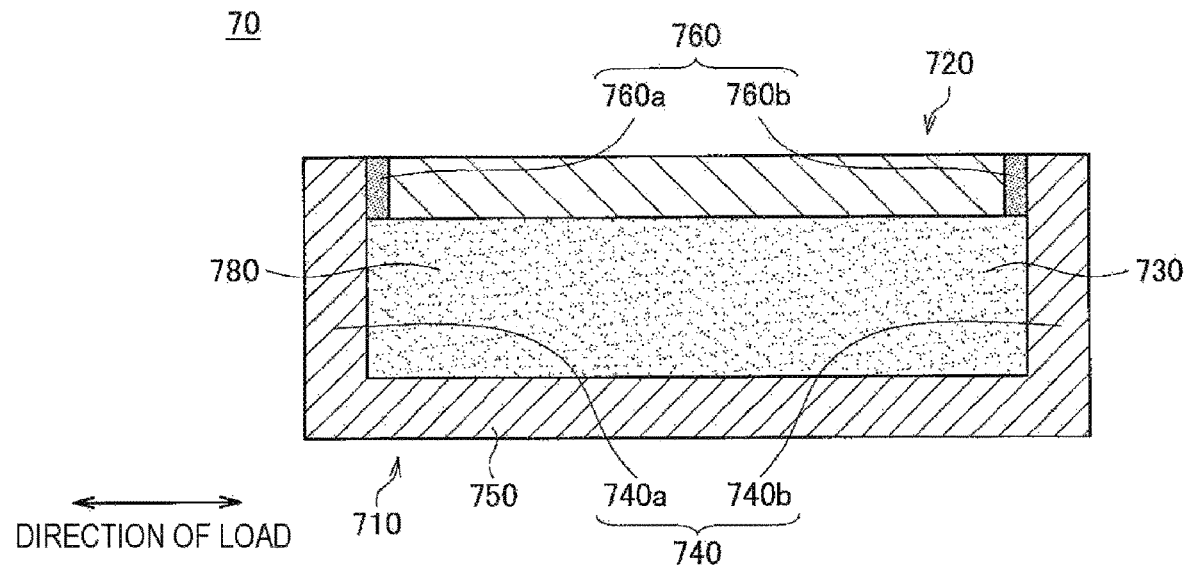

FIBER-REINFORCED RESIN STRUCTURE BODY

CROSS-REFERENCE TO RELATED APPLICATIONS

The present application claims priority from Japanese Patent Application No. 2018-176223 filed on Sep. 20, 2018, the entire contents of which are hereby incorporated by reference.

BACKGROUND

The disclosure relaters to a fiber-reinforced resin structure body.

These days, fiber-reinforced resins such as carbon fiber-reinforced plastics (CFRPs) are used in various structure bodies in order to improve strength while reducing weight. A fiber-reinforced resin structure body that is a structure body made of such a fiber-reinforced resin may include two or more fiber-reinforced resin members. In fields regarding a fiber-reinforced resin structure body including two or more fiber-reinforced resin members, technologies for improving the mechanical properties of the fiber-reinforced resin structure body are proposed.

For example, Japanese Unexamined Patent Application Publication No. 2000-108232 discloses a technology in which, in sandwich structure bodies each of which includes a core material and an FRP skin plate disposed on both surfaces of the core material and ends of both of which are butt-joined together, an FRP linking layer spreading over surfaces of both end areas is provided and a layer including a resin diffusion medium is provided between the butted end surfaces, in order to provide sandwich structure bodies of which ends can be easily and inexpensively joined together into one body without using a fastening member or the like, of which the joint can be provided with sufficiently high strength and rigidity, and which are excellent in external appearance.

SUMMARY

An aspect of the disclosure provides a fiber-reinforced resin structure body including a first member made of a fiber-reinforced resin, a second member made of a fiber-reinforced resin and forming a closed space by being joined to the first member, and a joint joining the first member and the second member together. One or both of the first member and the second member comprise a side wall having two side surfaces located on both sides in a direction of a load loaded on a swing end of the fiber-reinforced resin structure body. The joint is provided more inward than an outer wall surface located on an opposite side to the closed space out of the two side surfaces is.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 7 is a cross-sectional view illustrating an example of a configuration of a lower arm according to the embodiment;

FIG. 8C is a cross-sectional view illustrating an example of a configuration of a lower arm according to the first modified embodiment;

FIG. 8D is a cross-sectional view illustrating an example of a configuration of a lower arm according to the first modified embodiment;

FIG. 9 is a cross-sectional view illustrating an example of a configuration of a lower arm according to a second modified embodiment;

FIG. 10 is a cross-sectional view illustrating an example of a configuration of a lower arm according to a third modified embodiment;

FIG. 11 is a cross-sectional view illustrating an example of a configuration of a lower arm according to a fourth modified embodiment;

FIG. 12 is a cross-sectional view illustrating an example of a configuration of a lower arm according to a fifth modified embodiment.

DETAILED DESCRIPTION

Figure 1:
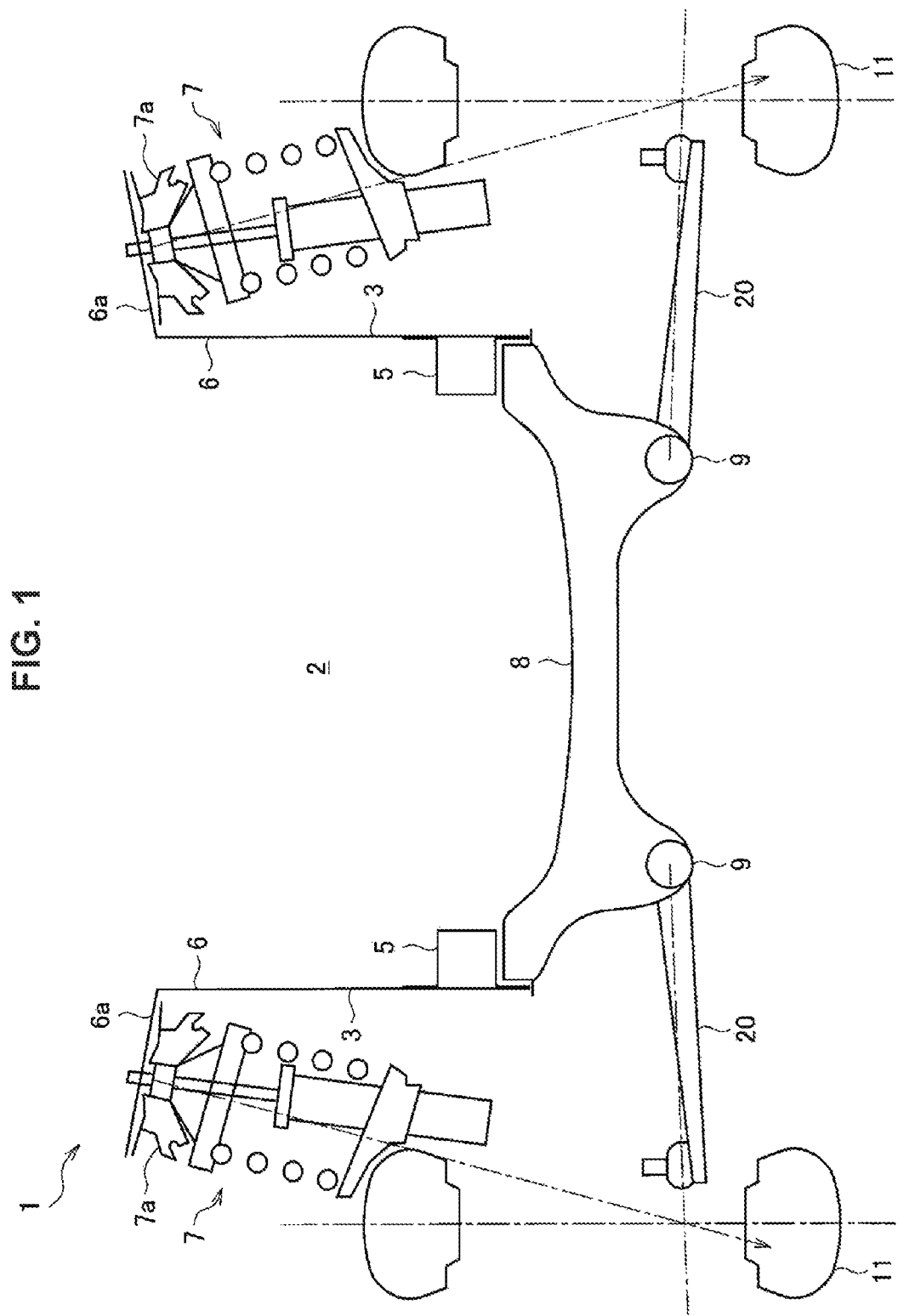
FIG. 1 is a schematic diagram illustrating an example of a configuration of a suspension system including a lower arm according to an embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. Meanwhile, also in regard to structural parts of an automobile body, constituent parts using fiber-reinforced resins such as carbon fiber-reinforced plastics (CFRPs) are becoming used for the weight reduction of the car body. For example, a fiber-reinforced resin structure body that includes two or more fiber-reinforced resin members and that has a joint between the fiber-reinforced resin members may be used as such a structural part of an automobile body. Here, a structural part of an automobile body may receive a relatively large load that generates stress such as tensile stress or compressive stress. When such stress has occurred in a structural part having a joint, breaking may occur generally from a joint with weak strength as a starting point. Thus, in the case where a fiber-reinforced resin structure body having a joint is used as a structural part of an automobile body, it is presumably desirable to improve the strength of the fiber-reinforced resin structure body against stress.

Thus, according to an embodiment of the disclosure, a new and improved fiber-reinforced resin structure body capable of improving strength against stress can be provided.

1. Suspension Apparatus

Figure 2:
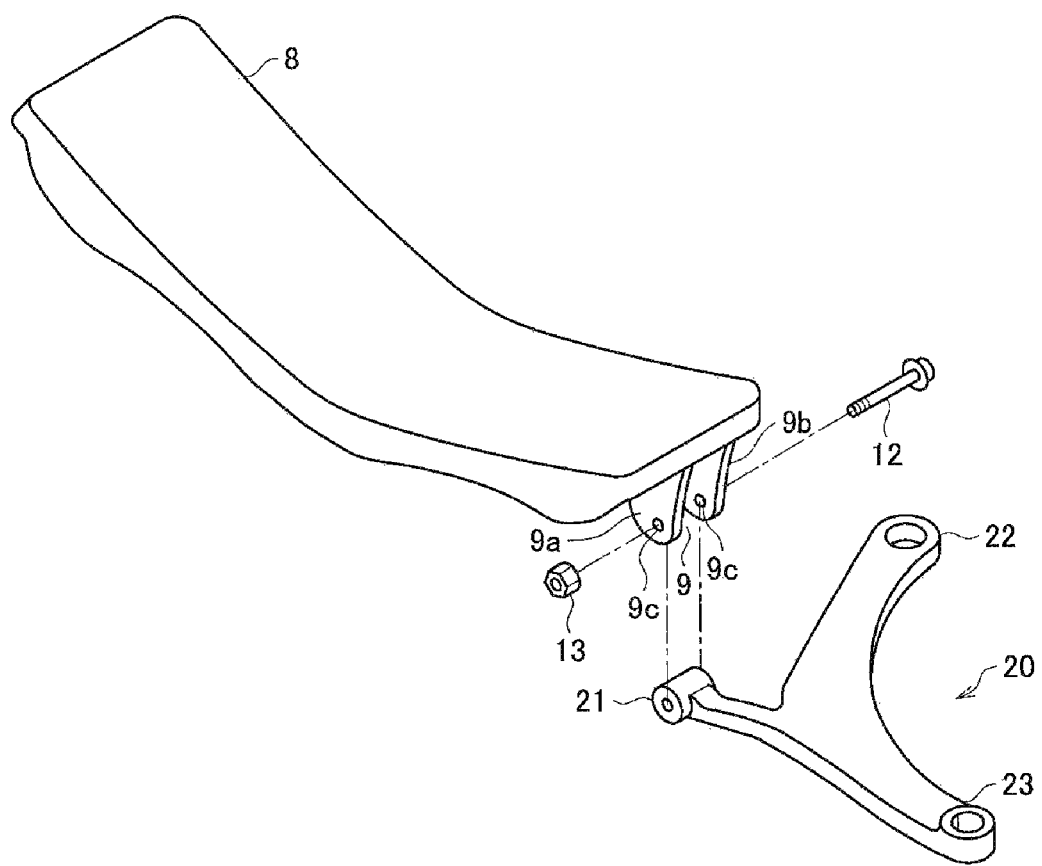
FIG. 2 is a disassembled perspective view of a lower arm and a suspension cross member.
Figure 3:
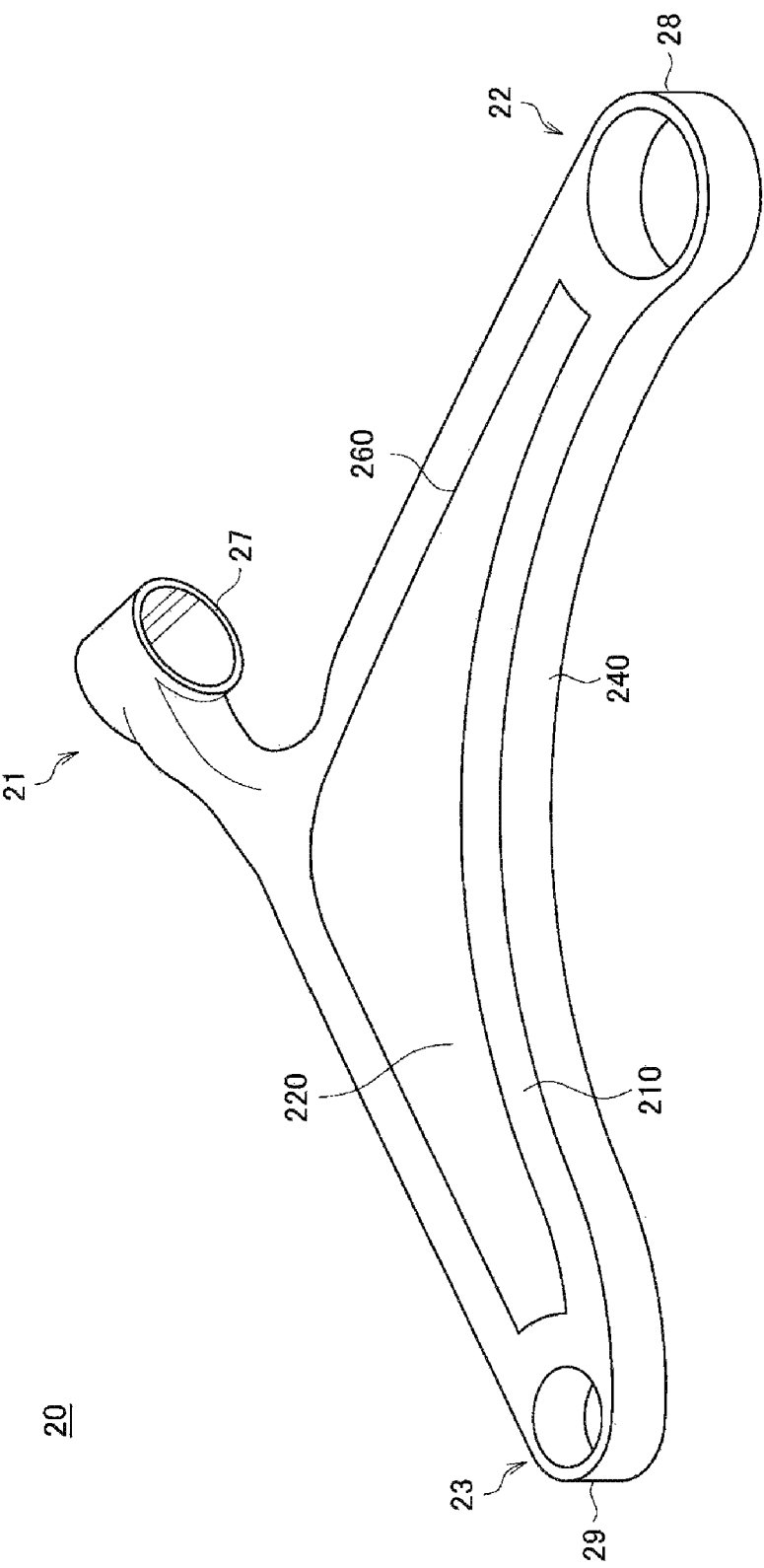
FIG. 3 is a perspective view illustrating an example of the lower arm according to the embodiment.

First, a suspension apparatus 1 including lower arms 20 of a vehicle each corresponding to a fiber-reinforced resin structure body according to the embodiment is described with reference to FIG. 1 to FIG. 3. FIG. 1 is a schematic diagram illustrating an example of the configuration of a suspension apparatus 1 of front wheels of a vehicle including lower arms 20, and FIG. 2 is a disassembled perspective view of a lower arm 20 and a suspension cross member 8. FIG. 3 is a perspective view illustrating an example of the lower arm 20.

As illustrated in FIG. 1, in the suspension apparatus 1, the left and right of an engine room 2 are partitioned by front wheel aprons 3 that are constituent elements of car body frames. The front wheel aprons 3 are joined to a pair of left and right side frames 5 extending in the front-rear direction of the car body. Strut towers 6 are formed on the rear side of the front wheel aprons 3. A strut suspension 7 is housed in the strut tower 6. The upper side of the suspension 7 is supported by a strut support 6a formed on the upper side of the strut tower 6, via a strut upper mount 7a.

A suspension cross member 8 is provided on the lower side of the engine room 2. Upper surfaces of the suspension cross member 8 at both ends in the vehicle width direction are fixed to the side frames 5 via fasteners such as bolts and nuts. The rear of a not-illustrated engine is installed on the upper surface of the suspension cross member 8 via an engine mount. Arm supports 9 are protruded from lower surfaces of the suspension cross member 8 at both ends in the vehicle width direction. As illustrated in FIG. 2, the left and right arm supports 9 include pairs of brackets 9a and 9b facing each other in the right and left and backward and forward directions with prescribed spacings, and a bolt insertion hole 9c is drilled in each of the brackets 9a and 9b. A cylindrical first base 21 provided at one root end of the lower arm 20 is disposed between the brackets 9a and 9b.

The lower arm 20 has a substantially T-like or L-like planar shape that continues from the first base 21 serving as one root end to a tip 23, branches from a central area to extend to the rear side, and continues to a second base 22 serving as another root end. A not-illustrated circular cylindrical member is press-fitted in the first base 21 of the lower arm 20. The shaft of a bolt 12 inserted from the outside into the bolt insertion holes 9c drilled in the brackets 9a and 9b is caused to pierce the circular cylindrical member, and the shaft of the bolt 12 is fastened by a nut 13.

A not-illustrated circular cylindrical member is press-fitted in the second base 22. The second base 22 is axially supported at the side frame 5 via the circular cylindrical member. A not-illustrated circular cylindrical member is press-fitted in the tip 23 serving as a swing end. The tip 23 is linked to a not-illustrated ball joint via the circular cylindrical member, and a not-illustrated wheel hub configured to fix a front wheel 11 is supported in a freely rotatable manner. Thereby, the lower arm 20 supports the lower side of the suspension 7 via a not-illustrated hub housing, and is supported at the suspension cross member 8 and the side frame 5 in a swingable manner.

As illustrated in FIG. 3, the lower arm 20 includes the first base 21 linked to the suspension cross member 8, the second base 22 linked to a side frame, and the tip 23 to which a ball joint is linked. A circular cylindrical member 27 is press-fitted in the first base 21. A circular cylindrical member 28 is press-fitted in the second base 22. A circular cylindrical member 29 is press-fitted in the tip 23. The circular cylindrical member 27 press-fitted in the cylindrical first base 21 has a center axis substantially agreeing with the front-rear direction of the vehicle, and enables upward and downward swinging of the tip 23. The circular cylindrical member 28 press-fitted in the second base 22 has a center axis running along a substantially vertical direction, and enables horizontal swinging of the tip 23.

The lower arm 20 according to the embodiment is a fiber-reinforced resin structure body in which two members each made of a fiber-reinforced resin are joined to each other. More specifically, as illustrated in FIG. 3, the lower arm 20 is obtained by a first member 210 made of a fiber-reinforced resin and a second member 220 made of a fiber-reinforced resin being joined together at a joint 260.

In the case where a member having a three-dimensional shape is molded using a fiber-reinforced resin like in the lower arm 20, generally there is a case where molding by pressing is difficult. Thus, as described later, each of the first member 210 and the second member 220 can be produced by, for example, sticking a laminated fiber-reinforced resin sheet to a molding surface of a mold and hardening the sheet. In each of the first member 210 and the second member 220 thus produced, the processing accuracy of the surface on the molding surface side is relatively high. Thus, the first member 210 and the second member 220 produced in this way are joined to each other such that their molding surfaces appear on the surface, and a lower arm 20 having a three-dimensional shape is produced.

As described later, the lower arm 20 described above may receive a relatively large load that generates stress such as tensile stress or compressive stress. The lower arm 20 according to the embodiment has the joint 260 in a position where such stress relatively does not concentrate. Thereby, according to the embodiment, even when such a lower arm 20 receives a relatively large load, the occurrence of breaking from the joint 260 as a starting point can be prevented. In the following, stress occurring in the lower arm 20 is described, and then details of the lower arm 20 capable of improving strength against stress are described.

2. Lower Arm 2-1. Stress of Lower Arm

Figure 4:
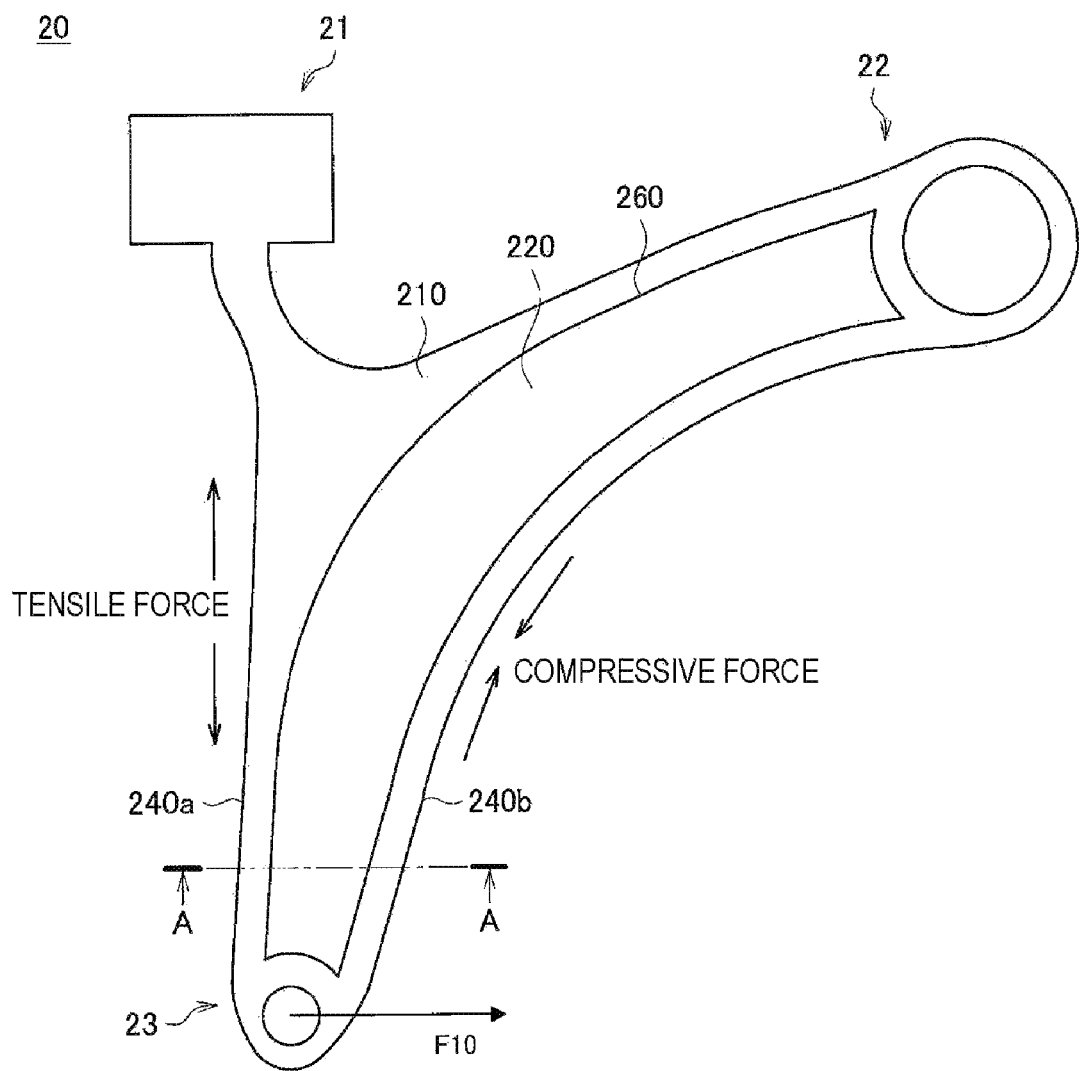
FIG. 4 is an explanatory diagram for describing stress occurring in the lower arm when the lower arm receives a load.
Figure 5:
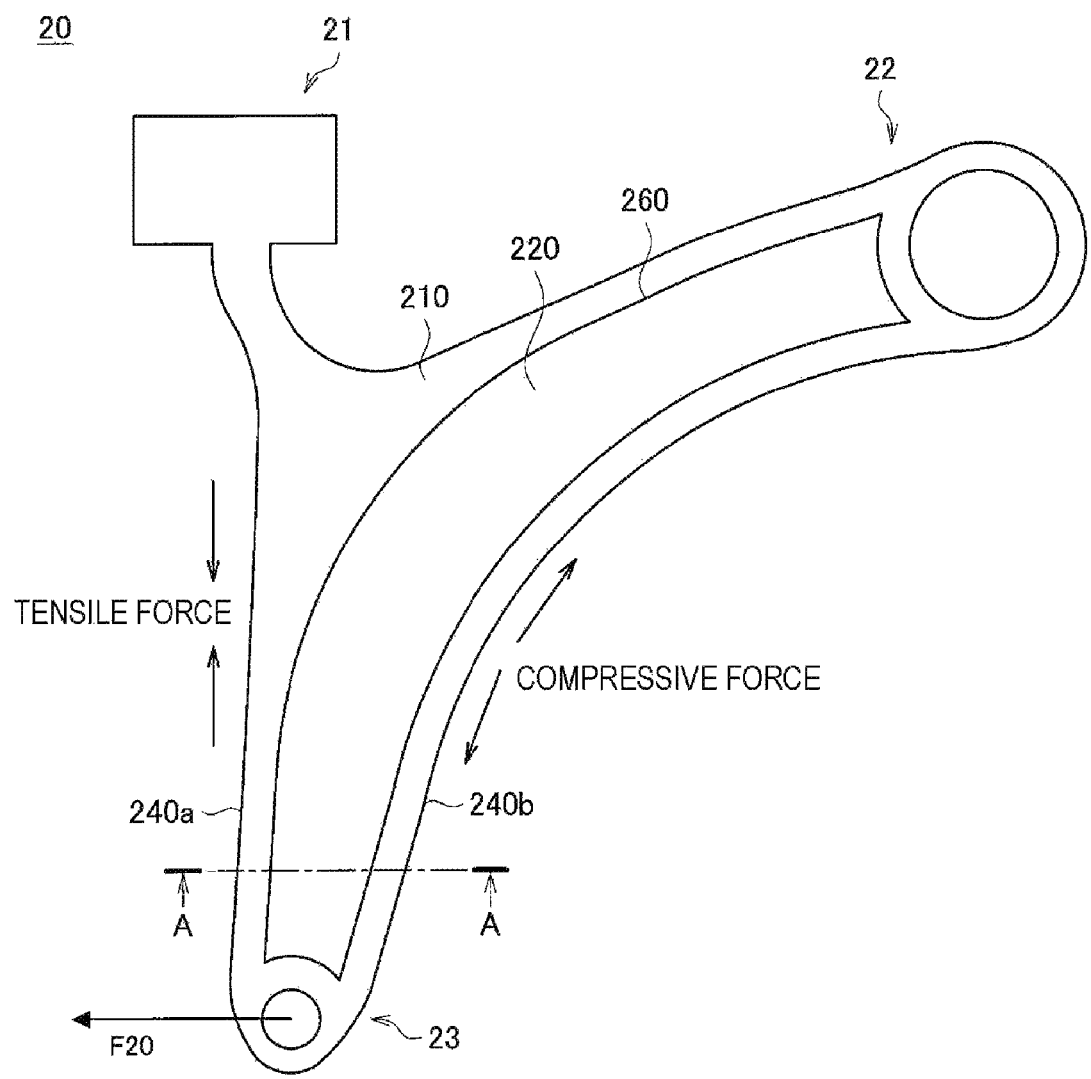
FIG. 5 is an explanatory diagram for describing stress occurring in the lower arm when the lower arm receives a load.

First, stress occurring in the lower arm 20 is described with reference to FIG. 4 and FIG. 5. FIG. 4 and FIG. 5 are explanatory diagrams for describing stress occurring in the lower arm 20 when the tip 23 of the lower arm 20 receives a load. FIG. 4 and FIG. 5 illustrate schematic diagrams of the lower arm 20 illustrated in FIG. 3 as viewed from the second member 220 side.

FIG. 4 illustrates a state where a load directed to the car body rear side is acting on the tip 23. Arrow F10 in FIG. 4 illustrates the direction of the load acting on the tip 23. As illustrated in FIG. 4, the load acting on the tip 23 has a component in the direction from the first base 21 toward the second base 22. In the lower arm 20, the first base 21 and the second base 22 are fixed to the car body. Therefore, when a load directed to the car body rear side is acting on the tip 23 as illustrated in FIG. 4, bending deformation in which the tip 23 warps toward the car body rear side occurs in the lower arm 20. Consequently, tensile force is loaded on a side wall 240a on the car body front side located between the tip 23 and the first base 21, and stress occurs in the side wall 240a. On the other hand, compressive force is loaded on a side wall 240b on the car body rear side located between the tip 23 and the second base 22, and stress occurs in the side wall 240b.

FIG. 5 illustrates a state where a load directed to the car body front side is acting on the tip 23. Arrow F20 in FIG. 5 illustrates the direction of the load acting on the tip 23. As illustrated in FIG. 5, the load acting on the tip 23 has a component in the direction from the second base 22 toward the first base 21. When a load directed to the car body front side is acting on the tip 23 as illustrated in FIG. 5, bending deformation in which the tip 23 warps toward the car body front side occurs in the lower arm 20. Consequently, compressive force is loaded on the side wall 240a on the car body front side, and stress occurs in the side wall 240a. On the other hand, tensile force is loaded on the side wall 240b on the car body rear side, and stress occurs in the side wall 240b.

Figure 6A:
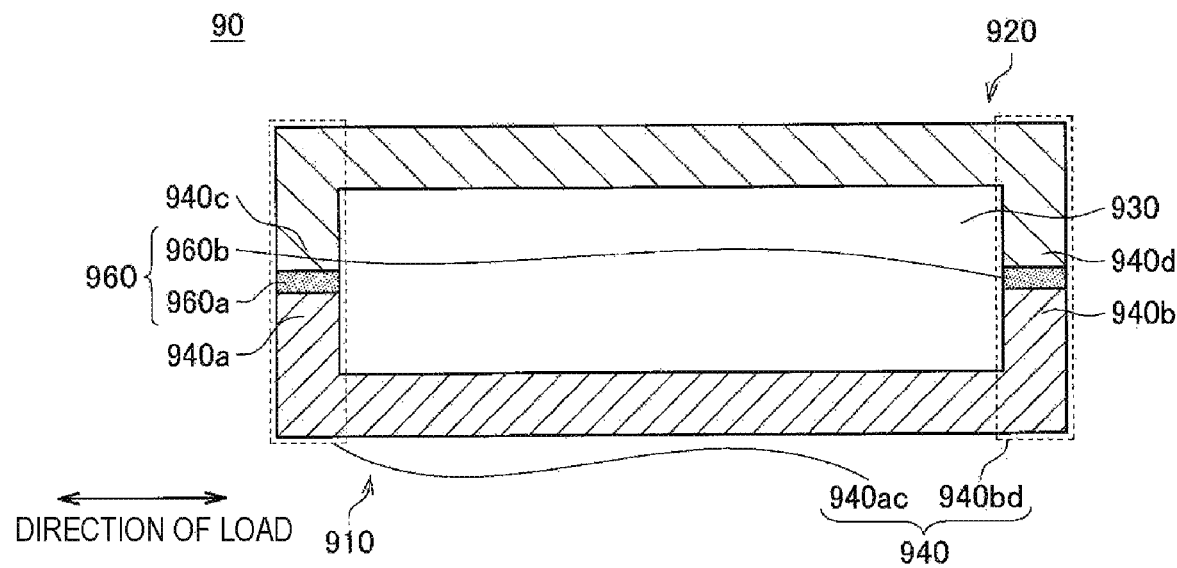
FIG. 6A is a cross-sectional view illustrating an example of a configuration of a lower arm according to a comparative example.
Figure 6B:
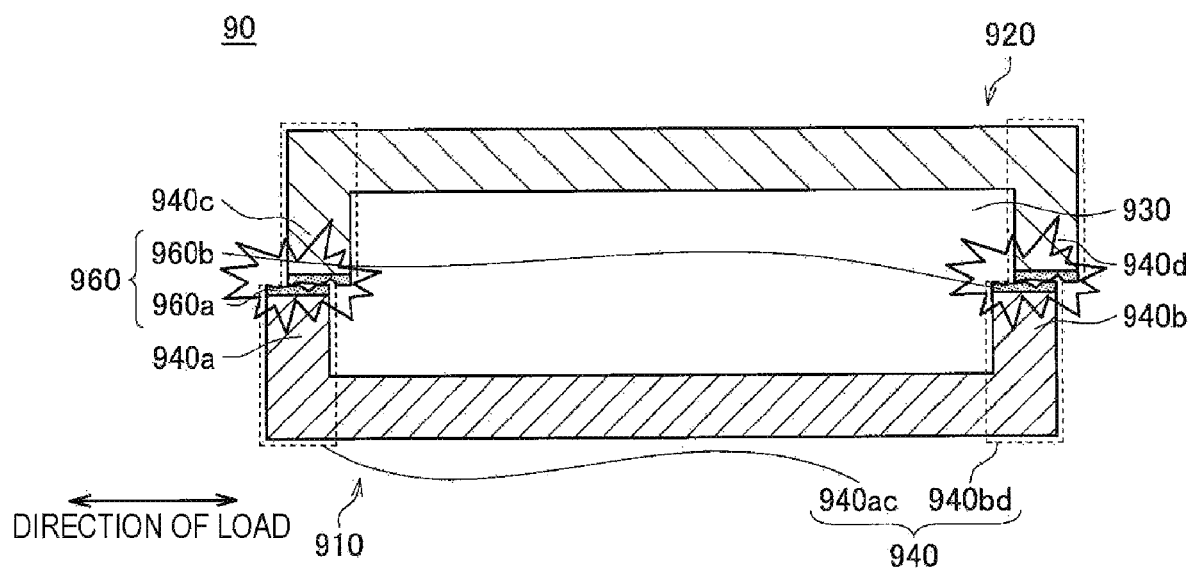
FIG. 6B is a cross-sectional view illustrating a situation where the lower arm according to the comparative example receives a load.

Here, a joint of a lower arm according to a comparative example in which, unlike the lower arm 20 according to the embodiment, a joint is provided in a position where stress concentrates is described. FIG. 6A is a cross-sectional view for describing an example of the configuration of a lower arm 90 according to the comparative example. FIG. 6B is a cross-sectional view for describing a situation where the lower arm 90 according to the comparative example receives a load. FIG. 6A and FIG. 6B illustrate cross sections in the tip of the lower arm 90 according to the comparative example, and correspond to the A-A cross section, which is a cross section along the direction of the load at the tip 23 of the lower arm 20 illustrated in FIG. 4 and FIG. 5.

As illustrated in FIG. 6A, the lower arm 90 according to the comparative example is obtained by a first member 910 and a second member 920 being joined together at a joint 960. The first member 910 is a member made of a fiber-reinforced resin and having a concavity opened on the second member 920 side, and has a side 940a on the car body front side and a side 940b on the car body rear side. The second member 920 is a member made of a fiber-reinforced resin and having a concavity opened on the first member 910 side, and has a side 940c on the car body front side and a side 940d on the car body rear side. The concavity side of the first member 910 and the concavity side of the second member 920 face each other, and an end of the side 940a and an end of the side 940c are joined together at a joint 960a on the car body front side. Further, an end of the side 940b and an end of the side 940d are joined together at a joint 960b on the car body rear side.

Thereby, a lower arm 90 having a side wall 940ac located on the car body front side and a side wall 940bd located on the car body rear side, and a closed space 930 formed between the first member 910 and the second member 920 is formed. In the side wall 940ac, a joint 960a that continues from the outer wall surface of the side wall 940ac located on the opposite side of the side wall 940ac from the closed space 930 to the inner wall surface of the side wall 940ac located on the closed space 930 side is formed. In the side wall 940bd, a joint 960b that continues from the outer wall surface of the side wall 940bd located on the opposite side of the side wall 940bd from the closed space 930 to the inner wall surface of the side wall 940bd located on the closed space 930 side is formed. That is, in the lower arm 90 according to the comparative example, parts of the joint 960 are exposed on outer wall surfaces of a side wall 940.

The side wall 940ac on the car body front side illustrated in FIG. 6A is located in an area of the lower arm 90 between the tip and a first base, and the side wall 940bd on the car body rear side is located in an area of the lower arm 90 between the tip and a second base. In a state where a load directed to the car body rear side is acting on the tip of the lower arm 90 as described with reference to FIG. 4, stress occurs in the side wall 940ac on the car body front side and the side wall 940bd on the car body rear side illustrated in FIG. 6A. Further, in a state where a load directed to the car body front side is acting on the tip of the lower arm 90 as described with reference to FIG. 5, stress occurs in the side wall 940ac on the car body front side and the side wall 940bd on the car body rear side illustrated in FIG. 6A.

In general, a position of an object where the maximum stress occurs when bending deformation occurs in the object is an outer layer of the object. Therefore, in a state where a load directed in the car body front-rear direction is acting on the tip of the lower arm 90, a position of the lower arm 90 where stress concentrates is outer wall surfaces of the side wall 940.

Further, in general, when stress occurs in an object having a joint, a position of the object that has weak strength and is likely to be a starting point of breaking is the joint. Therefore, in the lower arm 90 according to the comparative example in which parts of the joint 960 are exposed on outer wall surfaces of the side wall 940 where stress concentrates, when a load directed in the car body front-rear direction acts on the tip and stress has occurred in the lower arm 90, breaking may occur from the joint 960 as a starting point, as illustrated in FIG. 6B.

2-2. Configuration of Lower Arm

Next, the configuration of the lower arm 20 according to the embodiment is described with reference to FIG. 7. FIG. 7 is a cross-sectional view for describing an example of the configuration of the lower arm 20 according to the embodiment. FIG. 7 is specifically a cross-sectional view in the A-A cross section, which is a cross section along the direction of the load at the tip 23 of the lower arm 20 according to the embodiment illustrated in FIG. 4 and FIG. 5.

As illustrated in FIG. 7, the lower arm 20 according to the embodiment is obtained by the first member 210 and the second member 220 being joined together at the joint 260. As illustrated in FIG. 7, the first member 210 is a member made of a fiber-reinforced resin in which a cross section along the direction of the load at the tip 23 of the lower arm 20 is formed in a substantially U-like shape. The first member 210 has a side wall 240 substantially orthogonal to the direction of the load and a bottom surface 250 substantially parallel to the direction of the load. The second member 220 is a member made of a fiber-reinforced resin in which a cross section along the direction of the load is formed substantially in a straight line. The second member 220 forms a closed space 230 by being joined to the first member 210.

Each of the first member 210 and the second member 220 can be produced by various production methods. For example, each of the first member 210 and the second member 220 is produced by a method in which a fiber-reinforced resin sheet in which reinforcing fiber is impregnated with a matrix resin is stacked on, for example, a molding surface of a mold made of a metal, a fiber-reinforced resin, or the like, the resulting fiber-reinforced resin stacked body is covered with a covering material, a vacuum pump is used to depressurize the space between the covering material and the mold and thereby the fiber-reinforced resin sheet is stuck to the molding surface of the mold, and the fiber-reinforced resin sheet is hardened.

Each of the first member 210 and the second member 220 may be produced also by a method in which a fiber-reinforced resin sheet is stacked on a molding surface of a mold, the resulting fiber-reinforced resin stacked body is covered with a covering material, a fixed member is fixed above the covering material, air or vapor is fed to the space between the covering material and the fixed member to pressurize the space and thereby the fiber-reinforced resin sheet is stuck to the molding surface of the mold via the covering material, and the fiber-reinforced resin sheet is hardened. The space between the covering material and the fixed member fixed above the covering material may be pressurized while being heated using an autoclave apparatus.

Each of the first member 210 and the second member 220 may be produced also by a method in which the depressurization of the space between the covering material and the mold and the pressurization of the space between the covering material and the fixed member fixed above the covering material are performed in parallel.

The fiber-reinforced resin sheet serving as a molding material is formed by impregnating reinforcing fiber with a matrix resin. The reinforcing fiber used is not particularly limited; for example, the reinforcing fiber may be carbon fiber, glass fiber, aramid fiber, or the like, or these reinforcing fibers may be used in combination. Among them, carbon fiber has high mechanical properties, and allows strength design to be made easily; thus, the reinforcing fiber preferably contains carbon fiber.

The reinforcing fiber may be continuous fiber continuing from one end to the other end of the fiber-reinforced resin sheet, or may be short fiber shorter than the length from one end to the other end of the fiber-reinforced resin sheet. Continuous fiber and short fiber may coexist in one fiber-reinforced resin sheet. The fiber-reinforced resin sheet stacked in the production process of each of the first member 210 and the second member 220 may be a laminated fiber-reinforced resin sheet; and may include a fiber-reinforced resin sheet in which fibers are orientated in one direction, and may include a fiber-reinforced resin sheet in which reinforcing fibers are disposed in a plurality of directions. By equalizing the orientation directions of reinforcing fibers of each fiber-reinforced resin sheet, the strength to the orientation direction of the resulting first member 210 or second member 220 can be effectively improved. Further, by varying the orientation directions of reinforcing fibers of one or both of the fiber-reinforced resin sheets laminated together, anisotropy can be provided to the strength of the resulting first member 210 or second member 220.

A thermoplastic resin or a thermosetting resin is used as the matrix resin of the fiber-reinforced resin sheet. Examples of the thermoplastic resin include a polyethylene resin, a polypropylene resin, a polyvinyl chloride resin, an ABS resin, a polystyrene resin, an AS resin, a polyamide resin, a polyacetal resin, a polycarbonate resin, a thermoplastic polyester resin, a polyphenylene sulfide (PPS) resin, a fluorine resin, a polyetherimide resin, a polyether ketone resin, a polyimide resin, and the like.

One or a mixture of two or more of these thermoplastic resins may be used as the matrix resin. Alternatively, the matrix resin may be a copolymer of these thermoplastic resins. In the case where the matrix resin is a mixture of these thermoplastic resins, a compatibilizer may be used in combination. Further, the matrix resin may contain a bromine-based fire retardant, a silicon-based fire retardant, red phosphorus, or the like as a fire retardant.

In this case, examples of the thermoplastic resin used include polyolefin-based resins such as polyethylene and polypropylene, polyamide-based resins such as nylon 6 and nylon 66, polyester-based resins such as polyethylene terephthalate and polybutylene terephthalate, and resins such as a polyether ketone, a polyether sulfone, and an aromatic polyamide. In particular, the thermoplastic matrix resin is preferably at least one selected from the group consisting of a polyamide, polyphenylene sulfide, polypropylene, a polyether ether ketone, and a phenoxy resin.

Examples of the thermosetting resin that can be used as the matrix resin include an epoxy resin, an unsaturated polyester resin, a vinyl ester resin, a phenolic resin, a polyurethane resin, a silicon resin, and the like. One or a mixture of two or more of these thermosetting resins may be used as the matrix resin. In the case where any of these thermosetting resins is used for the matrix resin, an appropriate hardener or reaction accelerator may be added to the thermosetting resin.

The fiber-reinforced resin sheet is produced by, for example, a method in which reinforcing fiber is impregnated with a matrix resin while the reinforcing fiber is continuously delivered, by a common process such as a film impregnation method or a melt impregnation method. The fiber-reinforced resin sheet is cut to a desired size, and thereby a fiber-reinforced resin sheet as a molding material is obtained. Ends in the width direction of a plurality of fiber-reinforced resin sheets each cut in a desired size may be joined to each other by an adhesive or the like, and thereby a fiber-reinforced resin sheet with a desired width and a desired length may be formed. The thickness of the fiber-reinforced resin sheet may be a value in the range of 0.03 to 1 mm, for example.

The side wall 240 of the first member 210 has two side surfaces located on both sides in the direction of the load at the tip 23 of the lower arm 20. Specifically, an outer wall surface located on the opposite side of the side wall 240 from the closed space 230 and an inner wall surface located on the closed space 230 side are formed on the side wall 240. An outer wall surface located on the car body front side and an inner wall surface located on the car body rear side are formed on the side wall 240a on the car body front side, and an outer wall surface located on the car body rear side and an inner wall surface located on the car body front side are formed on the side wall 240b on the car body rear side.

The joint 260 joining the first member 210 and the second member 220 together is provided more on the inside than the outer wall surface of the side wall 240 is. For example, as illustrated in FIG. 7, the second member 220 is disposed on the inside of the first member 210, and is joined to the first member 210. More specifically, the ends of the second member 220 located on both sides in the direction of the load at the tip 23 of the lower arm 20 are joined to the inner wall surfaces of the side wall 240 of the first member 210 by an adhesive, and thereby the joint 260 is formed more on the inside than the outer wall surface of the side wall 240 is. That is, in the lower arm 20 according to the embodiment, the joint 260 is not exposed on the outer wall surface of the side wall 240.

At this time, as the adhesive that can be used for the joining of the first member 210 and the second member 220, an epoxy resin-based, acrylic resin-based, or urethane resin-based adhesive, or the like may be used, as appropriate. However, the method for joining the first member 210 and the second member 220 together is not limited to a method using an adhesive, and various methods may be employed, such as vibration melt pressure bonding and hot melt pressure bonding as typical examples.

In a state where a load directed to the car body rear side is acting on the tip 23 of the lower arm 20 as described with reference to FIG. 4, stress occurs in the side wall 240a on the car body front side and the side wall 240b on the car body rear side illustrated in FIG. 7. Further, in a state where a load directed to the car body front side is acting on the tip 23 of the lower arm 20 as described with reference to FIG. 5, stress occurs in the side wall 240a on the car body front side and the side wall 240b on the car body rear side illustrated in FIG. 7.

As described above, in general, a position of an object where the maximum stress occurs when bending deformation occurs in the object is an outer layer of the object. Therefore, in a state where a load directed in the car body front-rear direction is acting on the tip 23 of the lower arm 20, a position of the lower arm 20 where stress concentrates is outer wall surfaces of the side wall 240. Further, in general, when stress occurs in an object having a joint, a position of the object that has weak strength and is likely to be a starting point of breaking is the joint.

The lower arm 20 according to the embodiment has a structure in which the joint 260 is not exposed on the outer wall surface of the side wall 240. That is, in the lower arm 20 according to the embodiment, the joint 260 does not exist in a position where stress concentrates, but is provided in a position where stress relatively does not concentrate. Thereby, in the lower arm 20 according to the embodiment, when a load directed in the car body front-rear direction acts on the tip 23 and stress has occurred in the lower arm 20, the fear that breaking will occur from the joint 260 as a starting point can be reduced.

In the lower arm 20 according to the embodiment, the joining surface of the joint 260 is provided in a direction crossing the direction of the load at the tip 23 of the lower arm 20. More specifically, as illustrated in FIG. 7, the joining surface of the joint 260 is formed along the inner wall surface of the side wall 240 substantially orthogonal to the direction of the load.

In general, when an object receives a load and experiences bending deformation, tensile stress or compressive stress may occur in part of the object. For example, in a state where a load directed to the car body rear side is acting on the tip 23 of the lower arm 20 as described with reference to FIG. 4, tensile stress may occur on the car body front side of a joint 260a on the car body front side illustrated in FIG. 7, and compressive stress may occur on the car body rear side of the joint 260a. Further, tensile stress may occur on the car body front side of a joint 260b on the car body rear side, and compressive stress may occur on the car body rear side of the joint 260b. Further, in a state where a load directed to the car body front side is acting on the tip 23 of the lower arm 20 as described with reference to FIG. 5, compressive stress may occur on the car body front side of the joint 260a on the car body front side illustrated in FIG. 7, and tensile stress may occur on the car body rear side of the joint 260a. Further, compressive stress may occur on the car body front side of the joint 260b on the car body rear side, and tensile stress may occur on the car body rear side of the joint 260b.

Here, in the case where the same material is used and the same amount of bending deformation has occurred, the difference between the magnitude of the maximum tensile stress and the magnitude of the maximum compressive stress occurring in the joint 260 is influenced by the length of the joint 260 in a direction along the direction of the load at the tip 23 of the lower arm 20. Specifically, in the case where the length of the joint 260 along the direction of the load is long, the difference between the magnitude of the maximum tensile stress and the magnitude of the maximum compressive stress occurring in the joint 260 is large. On the other hand, in the case where the length of the joint 260 along the direction of the load is short, the difference between the magnitude of the maximum tensile stress and the magnitude of the maximum compressive stress occurring in the joint 260 is small. In the case where the difference between the magnitude of the maximum tensile stress and the magnitude of the maximum compressive stress occurring in the joint 260 is small, the fear that breaking will occur from the joint 260 as a starting point can be reduced.

The joining surface of the joint 260 of the embodiment is formed along the inner wall surface of the side wall 240 substantially orthogonal to the direction of the load at the tip 23 of the lower arm 20. That is, the length of the joint 260 along the direction of the load is short. Thereby, in the lower arm 20 according to the embodiment, when a load directed in the car body front-rear direction acts on the tip 23 and stress has occurred in the lower arm 20, the fear that breaking will occur from the joint 260 as a starting point can be reduced even more.

3. MODIFIED EMBODIMENTS

In the above, an example of the configuration of the lower arm according to the embodiment is described; however, the lower arm according to the embodiment may have various modifications. For example, in the case where a first member and a second member are joined together at a joint, a positioning structure that determines the position of the joint may be provided in one or both of the first member and the second member, and thereby the position of the joint can be easily determined while a closed space is formed. Some modified embodiments of such a lower arm will now be described.

3-1. First Modified Embodiment

FIG. 8A to FIG. 8D are cross-sectional views for describing examples of the configuration of a lower arm 30 according to a first modified embodiment. FIG. 8A to FIG. 8D illustrate cross sections in the tip of the lower arm 30 according to the first modified embodiment, and correspond to the A-A cross section, which is a cross section along the direction of the load at the tip of the lower arm illustrated in FIG. 4 and FIG. 5.

The lower arm 30 according to the first modified embodiment has a first member 310, a second member 320, a closed space 330, a side wall 340, a bottom surface 350, and a joint 360. The first member 310, the second member 320, the closed space 330, the side wall 340, the bottom surface 350, and the joint 360 correspond to the first member 210, the second member 220, the closed space 230, the side wall 240, the bottom surface 250, and the joint 260 of the lower arm 20 according to the embodiment, respectively.

The first modified embodiment differs from the embodiment in that a protrusion or a level difference is provided on one or both of the first member 310 and the second member 320. In the example illustrated in FIG. 8A, a protrusion 380 is formed from the bottom surface 350 of the first member 310 toward the second member 320 side. The tip of the protrusion 380 is in contact with the second member 320, and determines the position of the second member 320 with respect to the first member 310.

Figure 8A:
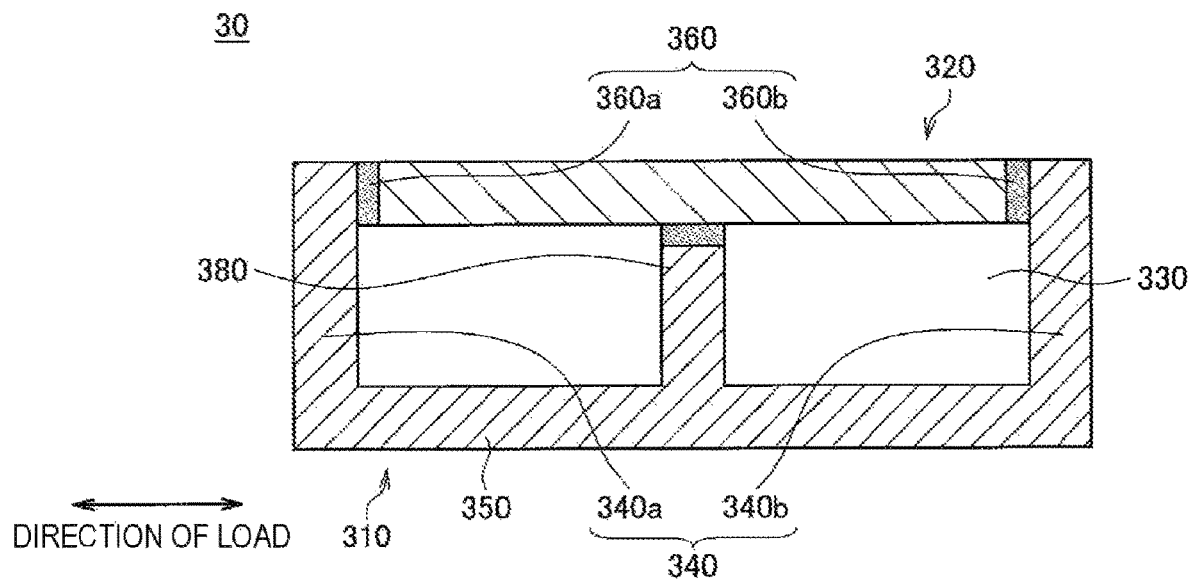
FIG. 8A is a cross-sectional view illustrating an example of a configuration of a lower arm according to a first modified embodiment.
Figure 8B:
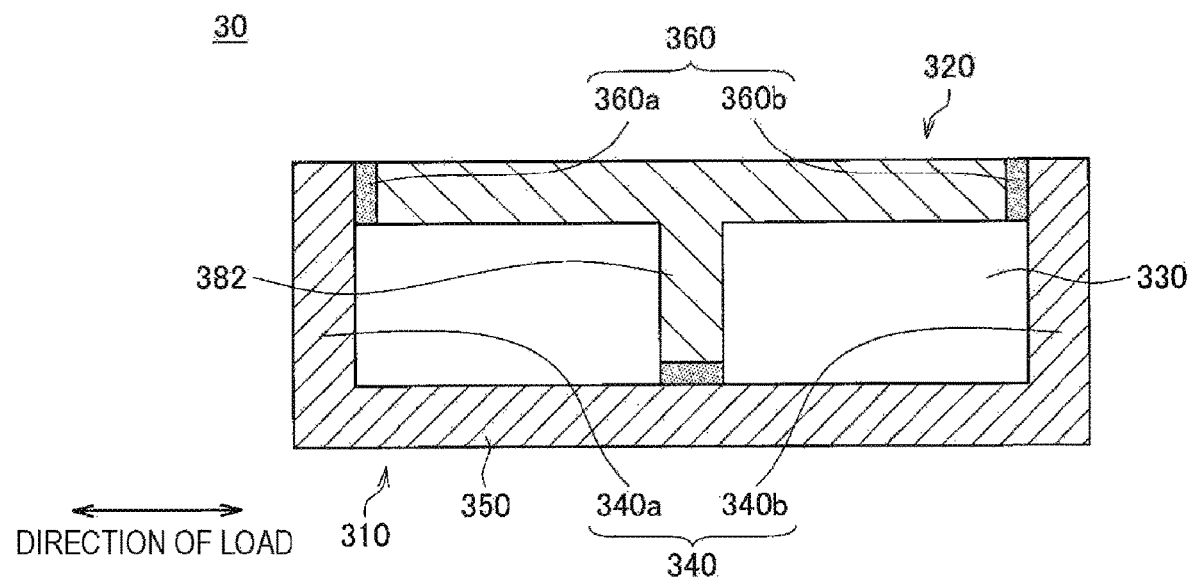
FIG. 8B is a cross-sectional view illustrating an example of a configuration of a lower arm according to the first modified embodiment.

In the example illustrated in FIG. 8B, a protrusion 382 is formed from part of the second member 320 toward the first member 310 side. The tip of the protrusion 382 is in contact with the first member 310, and determines the position of the second member 320 with respect to the first member 310.

In the example illustrated in FIG. 8C, a protrusion 384 protruding from the side wall 340 to the closed space 330 side is formed on part of the side wall 340 of the first member 310. The second member 320 side of the protrusion 384 is in contact with the second member 320, and determines the position of the second member 320 with respect to the first member 310.

In the example illustrated in FIG. 8D, a level difference 390 that is set back with respect to the side wall 340 from the closed space 330 side to the opposite side to the closed space 330 is formed at an end on the opening side of the side wall 340 of the first member 310. The position of the second member 320 with respect to the first member 310 is determined by the second member 320 being fitted in the level difference 390.

The position where each of the protrusions 380, 382, and 384 and the level difference 390 is provided is not limited to the example illustrated in any of FIG. 8A to FIG. 8D, and may be any position whereby the position of the joint 260 can be easily determined. Further, the shape of each of the protrusions 380, 382, and 384 and the level difference 390 is not limited to the example illustrated in any of FIG. 8A to FIG. 8D, and may be any shape whereby the position of the joint 260 can be easily determined. Further, the contacts between the protrusion 380 and the second member 320, the protrusion 382 and the first member 310, the protrusion 384 and the second member 320, and the level difference 390 and the second member 320 may be joined by, for example, an adhesive, or may not be joined.

Thus, in the first modified embodiment, a protrusion or a level difference is provided on one or both of the first member 310 and the second member 320. Thereby, in the case where the first member 310 and the second member 320 are joined together at the joint 360, the position of the joint 360 can be easily determined. Further, similarly to the embodiment, the joint 360 joining the first member 310 and the second member 320 together is provided more on the inside than the outer wall surface of the side wall 340 is. Thereby, when a load directed in the car body front-rear direction acts on the tip of the lower arm 30 and stress has occurred in the lower arm 30, the fear that breaking will occur from the joint 360 as a starting point can be reduced.

3-2. Second Modified Embodiment

FIG. 9 is a cross-sectional view for describing an example of the configuration of a lower arm 40 according to a second modified embodiment. FIG. 9 illustrates a cross section in the tip of the lower arm 40 according to the second modified embodiment, and corresponds to the A-A cross section, which is a cross section along the direction of the load at the tip of the lower arm illustrated in FIG. 4 and FIG. 5.

The lower arm 40 according to the second modified embodiment has a first member 410, a second member 420, a closed space 430, a side wall 440, a bottom surface 450, and a joint 460. The first member 410, the second member 420, the closed space 430, the side wall 440, the bottom surface 450, and the joint 460 correspond to the first member 210, the second member 220, the closed space 230, the side wall 240, the bottom surface 250, and the joint 260 of the lower arm 20 according to the embodiment, respectively.

The second modified embodiment differs from the embodiment in that an inclination is provided on the side wall 440 of the first member 410. In the example illustrated in FIG. 9, the side wall 440 of the first member 410 is formed as a surface that becomes farther from the facing side wall 440 with distance from the bottom surface 450 toward the second member 420 side. More specifically, a side wall 440a on the car body front side is formed as an inclined surface that becomes farther from a facing side wall 440b on the car body rear side with distance from the bottom surface 450 toward the second member 420 side. The side wall 440b on the car body rear side is formed as an inclined surface that becomes farther from the facing side wall 440a on the car body front side with distance from the bottom surface 450 toward the second member 420 side.

The second member 420 is formed with dimensions substantially coinciding with the dimensions of the opening side of the first member 410. More specifically, as illustrated in FIG. 9, the length of the second member 420 along the direction of the load at the tip of the lower arm 40 substantially coincides with the length from the opening side of the inner wall surface of the side wall 440a to the opening side of the inner wall surface of the side wall 440b.

The second member 420 is disposed on the inside of the first member 410, and is held at the first member 410 in a position where the dimensions of the opening side of the first member 410 and the dimensions of the second member 420 coincide. Thereby, the position of the second member 420 with respect to the first member 410 is determined.

Thus, in the second modified embodiment, an inclination is provided on the side wall 440 of the first member 410. Thereby, in the case where the first member 410 and the second member 420 are joined together at the joint 460, the position of the joint 460 can be easily determined. Further, similarly to the embodiment, the joint 460 joining the first member 410 and the second member 420 together is provided more on the inside than the outer wall surface of the side wall 440 is. Thereby, when a load directed in the car body front-rear direction acts on the tip of the lower arm 40 and stress has occurred in the lower arm 40, the fear that breaking will occur from the joint 460 as a starting point can be reduced.

3-3. Third Modified Embodiment

FIG. 10 is a cross-sectional view for describing an example of the configuration of a lower arm 50 according to a third modified embodiment. FIG. 10 illustrates a cross section in the tip of the lower arm 50 according to the third modified embodiment, and corresponds to the A-A cross section, which is a cross section along the direction of the load at the tip of the lower arm illustrated in FIG. 4 and FIG. 5.

The lower arm 50 according to the third modified embodiment has a first member 510, a second member 520, a closed space 530, a side wall 540, a bottom surface 550, and a joint 560. The first member 510, the second member 520, the closed space 530, the side wall 540, the bottom surface 550, and the joint 560 correspond to the first member 210, the second member 220, the closed space 230, the side wall 240, the bottom surface 250, and the joint 260 of the lower arm 20 according to the embodiment, respectively.

The third modified embodiment differs from the embodiment in that the lower arm 50 includes a cover member covering the first member 510 and the second member 520. In the example illustrated in FIG. 10, a cover member 580 is formed over the side wall 540 and the bottom surface 550 of the first member 510 and the second member 520. The cover member 580 is formed of, for example, a fiber-reinforced resin member containing reinforcing fiber.

A procedure in which the position of the second member 520 with respect to the first member 510 is determined by the cover member 580 will now be described. First, the second member 520 is joined to part of the cover member 580 formed in a flat surface shape. Subsequently, the cover member 580 is disposed on the opening side of the first member 510 so that the second member 520 joined to the cover member 580 is fitted into the opening of the first member 510. In a state where the second member 520 is fitted in the opening of the first member 510, the cover member 580 is bent so as to cover the side wall 540 and the bottom surface 550 of the first member 510, and is joined to the first member 510. Thus, the position of the second member 520 with respect to the first member 510 can be easily determined by using the cover member 580.

Further, when bending deformation has occurred in the lower arm 50, the cover member 580 strengthens the rigidity of the first member 510 and the second member 520 against tensile force loaded on the side wall 540. The cover member 580 is specifically a unidirectional fiber-reinforced resin member in which reinforcing fiber is orientated along the direction of tensile force loaded on the side wall 540. Here, tensile strength to the orientation direction of the fiber-reinforced resin member can be effectively improved by equalizing the orientation directions of reinforcing fibers contained in the fiber-reinforced resin member. Thus, rigidity to the direction of tensile force loaded on the side wall 540 can be strengthened by using, as the cover member 580, a unidirectional fiber-reinforced resin member in which reinforcing fiber is orientated along the direction of tensile force loaded on the side wall 540.

The cover member 580 does not necessarily need to be formed over the entire periphery of the first member 510 and the second member 520. For example, part of the side wall 540 of the first member 510 and the second member 520 may be covered with the cover member 580. However, by the cover member 580 being formed over the entire periphery of the first member 510 and the second member 520, the unity of the lower arm 50 as a member is ensured even more, and therefore the rigidity of the lower arm 50 can be strengthened more effectively.

Thus, in the third modified embodiment, the lower arm 50 includes the cover member 580 covering the first member 510 and the second member 520. Thereby, in the case where the first member 510 and the second member 520 are joined together at the joint 560, the position of the joint 560 can be easily determined. Further, rigidity to the direction of tensile stress occurring in the side wall 540 can be strengthened. Further, similarly to the embodiment, the joint 560 joining the first member 510 and the second member 520 together is provided more on the inside than the outer wall surface of the side wall 540 is. Thereby, when a load directed in the car body front-rear direction acts on the tip of the lower arm 50 and stress has occurred in the lower arm 50, the fear that breaking will occur from the joint 560 as a starting point can be reduced.

3-4. Fourth Modified Embodiment

FIG. 11 is a cross-sectional view for describing an example of the configuration of a lower arm 60 according to a fourth modified embodiment. FIG. 11 illustrates a cross section in the tip of the lower arm 60 according to the fourth modified embodiment, and corresponds to the A-A cross section, which is a cross section along the direction of the load at the tip of the lower arm illustrated in FIG. 4 and FIG. 5.

The lower arm 60 according to the fourth modified embodiment has a first member 610, a second member 620, a closed space 630, a side wall 640, a bottom surface 650, and a joint 660. The first member 610, the second member 620, the closed space 630, the side wall 640, the bottom surface 650, and the joint 660 correspond to the first member 210, the second member 220, the closed space 230, the side wall 240, the bottom surface 250, and the joint 260 of the lower arm 20 according to the embodiment, respectively.

The fourth modified embodiment differs from the embodiment in that a partition is provided between the first member 610 and the second member 620. In the example illustrated in FIG. 11, a partition 680 is formed in a substantially U-like shape, and a substantially U-like opening is disposed between the first member 610 and the second member 620 so as to be directed in a direction parallel to the direction of the load at the tip of the lower arm 60. One end of the partition 680 is in contact with the bottom surface 650 of the first member 610, and the other end is in contact with the second member 620; thereby, the position of the second member 620 with respect to the first member 610 is determined. At this time, the partition 680 exhibits also the effect of increasing the second moment of area of the lower arm 60 in a cross section along the direction of the load at the tip of the lower arm 60.

The position where the partition 680 is provided is not limited to the example illustrated in FIG. 11, and may be any position whereby the position of the joint 660 can be easily determined. Further, the shape of the partition 680 is not limited to the example illustrated in FIG. 11, and may be any shape whereby the position of the joint 660 can be easily determined. However, the shape is desirably a shape whereby the second moment of area of the lower arm 60 can be effectively increased. Further, the contacts between the partition 680 and the first member 610, and the partition 680 and the second member 620 may be joined by, for example, an adhesive, or may not be joined.

Thus, in the fourth modified embodiment, the partition 680 is provided between the first member 610 and the second member 620. Thereby, in the case where the first member 610 and the second member 620 are joined together at the joint 660, the position of the joint 660 can be easily determined, and the second moment of area of the lower arm 60 can be increased. Further, similarly to the embodiment, the joint 660 joining the first member 610 and the second member 620 together is provided more on the inside than the outer wall surface of the side wall 640 is. Thereby, when a load directed in the car body front-rear direction acts on the tip of the lower arm 60 and stress has occurred in the lower arm 60, the fear that breaking will occur from the joint 660 as a starting point can be reduced.

3-5. Fifth Modified Embodiment

FIG. 12 is a cross-sectional view for describing an example of the configuration of a lower arm 70 according to a fifth modified embodiment. FIG. 12 illustrates a cross section in the tip of the lower arm 70 according to the fifth modified embodiment, and corresponds to the A-A cross section, which is a cross section along the direction of the load at the tip of the lower arm illustrated in FIG. 4 and FIG. 5.

The lower arm 70 according to the fifth modified embodiment has a first member 710, a second member 720, a closed space 730, a side wall 740, a bottom surface 750, and a joint 760. The first member 710, the second member 720, the closed space 730, the side wall 740, the bottom surface 750, and the joint 760 correspond to the first member 210, the second member 220, the closed space 230, the side wall 240, the bottom surface 250, and the joint 260 of the lower arm 20 according to the embodiment, respectively.

The fifth modified embodiment differs from the embodiment in that a core material is embedded in the closed space 730 of the lower arm 70. In the example illustrated in FIG. 12, a core material 780 is embedded in the entire closed space 730 of the lower arm 70. As the core material 780, for example, a granular resin material or a foamable material may be used. The core material 780 is laid on the inside of the first member 710, and the second member 720 is mounted on the laid core material 780; thereby, the position of the second member 720 with respect to the first member 710 is determined.

Thus, in the fifth modified embodiment, a core material is embedded in the closed space 730 of the lower arm 70. Thereby, in the case where the first member 710 and the second member 720 are joined together at the joint 760, the position of the joint 760 can be easily determined. Further, similarly to the embodiment, the joint 760 joining the first member 710 and the second member 720 together is provided more on the inside than the outer wall surface of the side wall 740 is. Thereby, when a load directed in the car body front-rear direction acts on the tip of the lower arm 70 and stress has occurred in the lower arm 70, the fear that breaking will occur from the joint 760 as a starting point can be reduced.

3-6. Sixth Modified Embodiment

Figure 13:
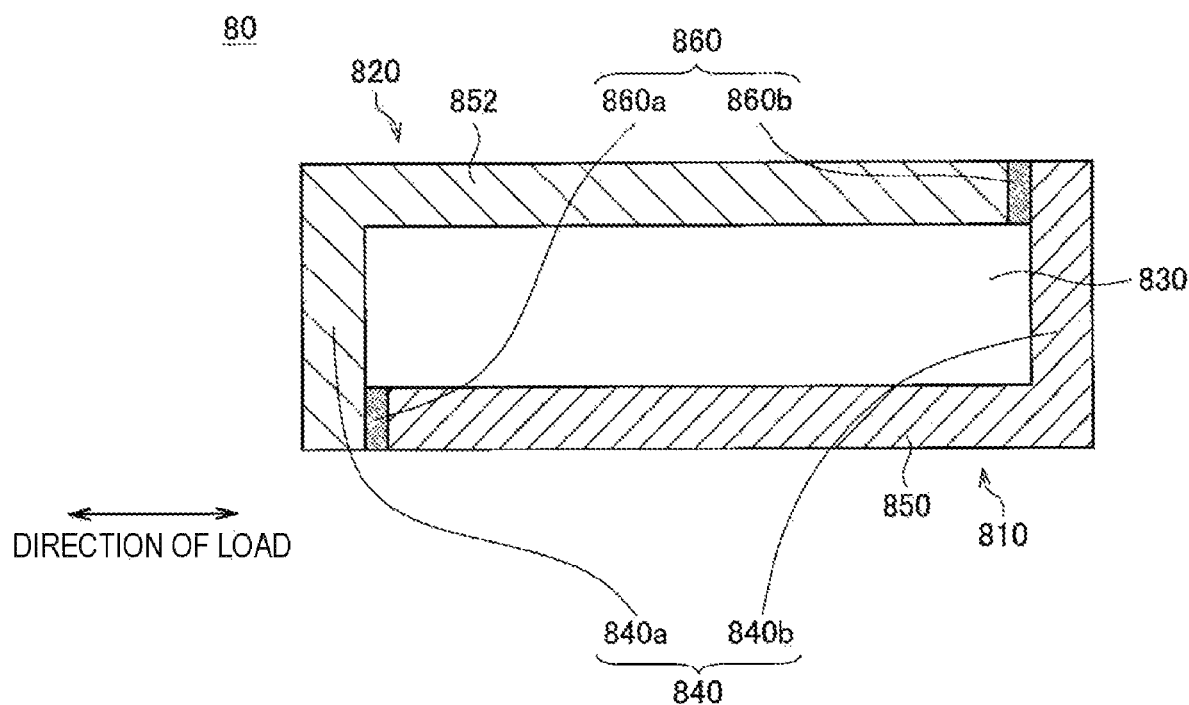
FIG. 13 is a cross-sectional view illustrating an example of a configuration of a lower arm according to a sixth modified embodiment.

FIG. 13 is a cross-sectional view for describing an example of the configuration of a lower arm 80 according to a sixth modified embodiment. FIG. 13 illustrates a cross section in the tip of the lower arm 80 according to the sixth modified embodiment, and corresponds to the A-A cross section, which is a cross section along the direction of the load at the tip of the lower arm illustrated in FIG. 4 and FIG. 5.

The lower arm 80 according to the sixth modified embodiment has a first member 810, a second member 820, a closed space 830, a side wall 840, a bottom surface 850, an upper surface 852, and a joint 860.

The sixth modified embodiment differs from the embodiment in that a cross section of each of the first member 810 and the second member 820 along the direction of the load at the tip of the lower arm 80 is formed in a substantially L-like shape. The first member 810 is a member made of a fiber-reinforced resin and having a side wall 840b substantially orthogonal to the direction of the load at the tip of the lower arm 80 and the bottom surface 850 substantially parallel to the direction of the load. In the first member 810, a cross section along the direction of the load is formed in a substantially L-like shape as illustrated in FIG. 13. The second member 820 is a member made of a fiber-reinforced resin and having a side wall 840a substantially orthogonal to the direction of the load and the upper surface 852 substantially parallel to the direction of the load. The second member 820 forms the closed space 830 by being joined to the first member 810. In the second member 820, a cross section along the direction of the load is formed in a substantially L-like shape as illustrated in FIG. 13.

In the case where the second member 820 is joined to the first member 810, the inner wall surface of the side wall 840b of the first member 810 and an end of the upper surface 852 of the second member 820 are joined together at a joint 860b. Further, the inner wall surface of the side wall 840a of the second member 820 and an end of the bottom surface 850 of the first member 810 are joined together at a joint 860a. At this time, the first member 810 is disposed in such a manner that the side wall 840b of the first member 810 is located on the lower side, and the second member 820 is mounted on the first member 810 in such a manner that the side wall 840a of the second member 820 is located on the upper side; thereby, the position of the second member 820 with respect to the first member 810 is determined.

Thus, in the sixth modified embodiment, a cross section of each of the first member 810 and the second member 820 along the direction of the load at the tip of the lower arm 80 is formed in a substantially L-like shape. Further, the joint 860 is provided on the inner wall surface of the side wall 840 of each of the first member 810 and the second member 820. Thereby, in the case where the first member 810 and the second member 820 are joined together at the joint 860, the position of the joint 860 can be easily determined. Further, similarly to the embodiment, the joint 860 joining the first member 810 and the second member 820 together is provided more on the inside than the outer wall surface of the side wall 840 is. Thereby, when a load directed in the car body front-rear direction acts on the tip of the lower arm 80 and stress has occurred in the lower arm 80, the fear that breaking will occur from the joint 860 as a starting point can be reduced.

4. CONCLUSIONS

As described hereinabove, the lower arm 20 according to the embodiment includes the first member 210 made of a fiber-reinforced resin and the second member 220 made of a fiber-reinforced resin and forming the closed space 230 by being joined to the first member 210. The first member 210 has the side wall 240 substantially orthogonal the direction of the load at the tip 23, which is a swing end of the lower arm 20. The side wall 240 has an outer wall surface and an inner wall surface located on both sides in the direction of the load. The joint 260 joining the first member 210 and the second member 220 together is provided more on the inside than the outer wall surface of the side wall 240 is.

Thereby, when a load directed in the car body front-rear direction acts on the tip 23 and stress has occurred in the lower arm 20, the fear that breaking will occur from the joint 260 as a starting point can be reduced. Therefore, the strength of the lower arm 20 against stress can be improved.

Although the preferred embodiments of the disclosure have been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure. Further, also forms in which some or all of the embodiment and the modified embodiments described above are combined should be seen as within the technical scope of the disclosure, as a matter of course.

For example, although in the above an example in which the first member 210 is disposed on the lower side and the second member 220 is disposed on the upper side is described, the positional relationship between the first member 210 and the second member 220 is not limited to this example. The first member 210 may be disposed on the upper side, and the second member 220 may be disposed on the lower side.

Further, although in the above an example in which the fiber-reinforced resin structure body of the embodiment of the disclosure is used for a lower arm is described, the disclosure is not limited to this embodiment. The disclosure can be applied also to, for example, any other structure such as an upper arm as long as it is a fiber-reinforced resin structure body in which two or more members each made of a fiber-reinforced resin are joined together at a joint.

The invention claimed is:

1. A fiber-reinforced resin structure body comprising:
a first member including a fiber-reinforced resin;
a second member including a fiber-reinforced resin and forming a closed space by being joined to the first member; and
a joint joining the first member and the second member together,
wherein one or both of the first member and the second member comprise a side wall having two side surfaces located on both sides in a direction of a load to be loaded on a swing end of the fiber-reinforced resin structure body,
wherein the joint is provided more inward than an outer wall surface located on an opposite side to the closed space, and
wherein a side surface of the closed space includes an inner surface of the joint that extends between the first member and the second member.

2. The fiber-reinforced resin structure body according to claim 1, wherein a joining surface of the joint is provided in a direction crossing the direction of the load.

3. The fiber-reinforced resin structure body according to claim 1, wherein a cross section along the direction of the load of the first member has a substantially U-like shape, and
wherein the second member is disposed on an inside of the first member.

4. The fiber-reinforced resin structure body according to claim 2, wherein a cross section along the direction of the load of the first member has a substantially U-like shape, and
wherein the second member is disposed on an inside of the first member.

5. The fiber-reinforced resin structure body according to claim 1, wherein one or both of the first member and the second member include a positioning structure configured to determine a position of the joint.

6. The fiber-reinforced resin structure body according to claim 2, wherein one or both of the first member and the second member include a positioning structure configured to determine a position of the joint.

7. The fiber-reinforced resin structure body according to claim 5, wherein the positioning structure comprises a protrusion or a level difference provided on one or both of the first member and the second member.

8. The fiber-reinforced resin structure body according to claim 6, wherein the positioning structure comprises a protrusion or a level difference provided on one or both of the first member and the second member.

9. The fiber-reinforced resin structure body according to claim 5, wherein the positioning structure comprises an inclination provided on the side wall of one or both of the first member and the second member.

10. The fiber-reinforced resin structure body according to claim 7, wherein the positioning structure comprises an inclination provided on the side wail of one or both of the first member and the second member.

11. The fiber-reinforced resin structure body according to claim 5, wherein the positioning structure comprises a cover member covering the first member and the second member.

12. The fiber-reinforced resin structure body according to claim 7, wherein the positioning structure comprises a cover member covering the first member and the second member.

13. The fiber-reinforced resin structure body according to claim 5, wherein the positioning structure comprises a partition provided between the first member and the second member.

14. The fiber-reinforced resin structure body according to claim 7, wherein the positioning structure comprises a partition provided between die first member and the second member.

15. The fiber-reinforced resin structure body according to claim 5, wherein the positioning structure comprises a core material embedded in the closed space.

16. The fiber-reinforced resin structure body according to claim 7, wherein the positioning structure comprises a core material embedded in the closed space.

17. The fiber-reinforced resin structure body according to claim 1, wherein a cross section along the direction of the load of each of the first member and the second member has a substantially L-like shape, and
wherein the joint is provided on an inner wall surface located on a side of the closed space out of the two side surfaces of each of the first member and the second member.

18. The fiber-reinforced resin structure body according to claim 1, wherein the fiber-reinforced resin structure body comprises a lower arm.

19. The fiber-reinforced resin structure body according to claim 1, wherein the inner surface of the joint is directly exposed to the closed space.

20. The fiber-reinforced resin structure body according to claim 1, wherein an outer surface of the joint is flush with an outer surface of the first member and an outer surface of the second member.

* * * * *